(12) United States Patent
Zhu et al.

(10) Patent No.: US 11,943,035 B2
(45) Date of Patent: *Mar. 26, 2024

(54) BEAM FAILURE RECOVERY

(71) Applicant: LENOVO (BEIJING) LIMITED, Beijing (CN)

(72) Inventors: Chenxi Zhu, Beijing (CN); Lianhai Wu, Beijing (CN); Zhennian Sun, Beijing (CN); Hongmei Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,902

(22) Filed: Mar. 6, 2023

(65) Prior Publication Data

US 2023/0208498 A1 Jun. 29, 2023

Related U.S. Application Data

(63) Continuation of application No. 16/981,136, filed as application No. PCT/CN2018/079293 on Mar. 16, 2018, now Pat. No. 11,601,181.

(51) Int. Cl.
| | |
|---|---|
| *H04B 7/06* | (2006.01) |
| *H04W 72/044* | (2023.01) |
| *H04W 72/23* | (2023.01) |
| *H04W 72/53* | (2023.01) |

(Continued)

(52) U.S. Cl.
CPC ........ *H04B 7/0695* (2013.01); *H04W 72/046* (2013.01); *H04W 72/23* (2023.01); *H04W 72/53* (2023.01); *H04W 74/0833* (2013.01); *H04W 76/19* (2018.02); *H04W 80/02* (2013.01)

(58) Field of Classification Search
CPC .... H04B 7/0695; H04W 76/19; H04W 72/53; H04W 72/23; H04W 72/046; H04W 74/0833; H04W 80/02
See application file for complete search history.

(56) References Cited

U.S. PATENT DOCUMENTS

| | | | |
|---|---|---|---|
| 2018/0034515 A1* | 2/2018 | Guo | H04B 7/0404 |
| 2018/0138962 A1* | 5/2018 | Islam | H04L 5/0032 |
| 2019/0036590 A1* | 1/2019 | Nagaraja | H04B 7/088 |

(Continued)

FOREIGN PATENT DOCUMENTS

CN 103037427 A 4/2013

OTHER PUBLICATIONS

CMCC, "Discussion on beam recovery for NR", R1-1612189, 3GPP TSG RAN WG1 #87, China Mobile Communications Corporation, Nov. 14-18, 2016, pp. 1-4.

(Continued)

*Primary Examiner* — Jael M Ulysse
(74) *Attorney, Agent, or Firm* — Kunzler Bean & Adamson

(57) ABSTRACT

Methods and apparatuses for recovering from beam failure are disclosed. A method of recovering from beam failure, comprising: sending a beam failure recovery request message including information regarding beam failure recovery and information regarding a new candidate beam via a working beam of a first cell; monitoring a response via the new candidate beam of a second cell; and receiving the response via the new candidate beam from the second cell.

20 Claims, 7 Drawing Sheets

(51) Int. Cl.
*H04W 76/19* (2018.01)
*H04W 80/02* (2009.01)

(56) References Cited

U.S. PATENT DOCUMENTS

| | | | |
|---|---|---|---|
| 2019/0053288 A1* | 2/2019 | Zhou | H04B 7/0626 |
| 2019/0053314 A1* | 2/2019 | Zhou | H04B 7/0695 |
| 2019/0059129 A1* | 2/2019 | Luo | H04W 52/0216 |
| 2019/0074882 A1* | 3/2019 | Zhou | H04W 52/146 |
| 2019/0075014 A1* | 3/2019 | Zhou | H04W 74/0833 |
| 2019/0081687 A1* | 3/2019 | Sadiq | H04W 72/046 |
| 2019/0089579 A1* | 3/2019 | Sang | H04W 40/16 |
| 2019/0098520 A1* | 3/2019 | Kim | H04B 7/0404 |
| 2019/0190582 A1* | 6/2019 | Guo | H04L 1/0061 |
| 2019/0200248 A1* | 6/2019 | Basu Mallick | H04L 41/0672 |
| 2019/0207662 A1* | 7/2019 | Zhou | H04W 24/08 |
| 2019/0215820 A1* | 7/2019 | Cirik | H04B 17/17 |
| 2019/0215888 A1* | 7/2019 | Cirik | H04B 7/088 |
| 2019/0245737 A1* | 8/2019 | Zhou | H04B 7/06 |
| 2019/0253941 A1* | 8/2019 | Cirik | H04W 36/0077 |
| 2019/0253986 A1* | 8/2019 | Jeon | H04L 5/0048 |
| 2019/0274098 A1* | 9/2019 | Cheng | H04L 5/0025 |
| 2020/0170065 A1* | 5/2020 | Xue | H04W 80/02 |
| 2020/0221429 A1* | 7/2020 | Li | H04L 5/0053 |
| 2020/0374960 A1* | 11/2020 | Deenoo | H04W 76/16 |
| 2020/0404638 A1* | 12/2020 | Deogun | H04W 76/19 |
| 2021/0068162 A1* | 3/2021 | Agiwal | H04L 41/0668 |
| 2022/0345267 A1* | 10/2022 | Zhou | H04B 7/0626 |

OTHER PUBLICATIONS

MediaTek, "Beam Recovery Considerations for Above-6 GHz", R1-1612131, 3GPP TSG RAN WG1 Meeting #87, MediaTek, Inc., Nov. 14-18, 2016, pp. 1-3.

PCT/CN2018/079293, "International Search Report and the Written Opinion of the International Search Authority" ISA/CN, State Intellectual Property Office of the P.R. China, Aug. 16, 2019, pp. 1-7.

* cited by examiner

BEAM FAILURE RECOVERY

FIELD

The subject matter disclosed herein generally relates to wireless communications, and more particularly relates to beam failure recovery for NR carrier aggregation.

BACKGROUND

The following abbreviations are herewith defined, some of which are referred to within the following description: Third Generation Partnership Project (3GPP), Downlink (DL), Evolved Node B (eNB), European Telecommunications Standards Institute (ETSI), Frequency Division Duplex (FDD), Frequency Division Multiple Access (FDMA), Long Term Evolution (LTE), Next Generation Node B (gNB), New Radio (NR), Negative Acknowledgment (NACK), Orthogonal Frequency Division Multiplexing (OFDM), Physical Resource Block (PRB), Physical Downlink Shared Channel (PDSCH), Physical Uplink Control Channel (PUCCH), Physical Uplink Shared Channel (PUSCH), Positive Acknowledgment (ACK), Radio Resource Control (RRC), Single Carrier Frequency Division Multiple Access (SC-FDMA), System Information (SI), Signal to Interference plus Noise Ratio (SINR), Transport Block (TB), Time-Division Duplex (TDD), Time Division Multiplex (TDM), User Entity/Equipment (Mobile Terminal) (UE), Uplink (UL), Universal Mobile Telecommunications System (UMTS), and Worldwide interoperability for Microwave Access (WiMAX). Channel Status Indicator Reference Signal (CSI-RS), Transmission Configuration indication (TCI), Physical Downlink Control Channel (PDCCH), Block Error Rate (BLER), Media Access Control (MAC), physical (PHY), Random Access Channel (RACH), Physical Random Access Channel (PRACH), Primary cell (Pcell), Primary-Secondary Cell (PScell), Secondary cell (Scell), Carrier Aggregation (CA), Single Side Band (SSB), Radio Resource Control (RRC), Control Resource Set (CORSET or CORESET), Cell Radio Network Temporary Identifier (C-RNTI), Cyclic Redundancy Check (CRC), Quasi co-location (QCL), Physical Downlink Shared Channel (PDSCH), Control Element (CE), Physical Uplink Shared Channel (PUSCH), Physical Uplink Control Channel (PUCCH), Transmit (TX), Receive (RX), and Transmission Receiving Point (TRP).

According to NR (New Radio) R.15 specification, a UE is required to periodically monitor the CSI-RS quasi co-located with the TCI (Transmission Configuration Indication) of the configured PDCCH, and calculate the hypothetical BLER (Block Error Rate) of the PDCCH. The UE reports these BLERs to the MAC layer. When the last serving beam fails (defined by its BLER falling below a threshold consecutively for a predefined number of times), the MAC layer will instruct the PHY layer to initiate the beam recovery process.

Traditional beam recovery process does not consider the carrier aggregation (CA) situation in which a UE is connected to a base unit via more than one component carrier. The component carriers are aggregated to support wider bandwidth. The beam recovery process in the CA situation will be disclosed.

BRIEF SUMMARY

Methods and apparatuses for recovering from beam failure are disclosed.

In one embodiment, a method of recovering from beam failure comprises: sending a beam failure recovery request message including information regarding beam failure recovery and information regarding a new candidate beam via a working beam of a first cell; monitoring a response via the new candidate beam of a second cell; and receiving the response via the new candidate beam from the second cell.

In one embodiment, the beam failure recovery request message is sent via PUSCH or PUCCH of the first cell. The beam failure recovery request message may be sent via PUCCH of the second cell before it is sent via PUSCH or PUCCH of the first cell.

In another embodiment, the beam failure recovery request message is sent via one of PUSCH of the first cell, PUCCH of the first cell and PUCCH of the second cell. The beam failure recovery request message may be sent in the way of a MAC CE, and the MAC CE may be scheduled in a priority higher than other uplink transmissions In some embodiment, the response is monitored via the same beam as the new candidate beam from sending the beam failure recovery request message for a predetermined time period. The response may be a CORSET resource preconfigured for beam recovery sent via PDCCH. PDCCH is monitored in a predefined CORSET. The method may further comprise receiving, via PDSCH, TCI state information in a RRC configuration message.

In some embodiment, the first cell is Pcell or PScell and the second cell is Scell. Alternatively, the first cell is Scell and the second cell is Pcell or PScell. In this condition, before sending the beam failure recovery request message via the working beam of the Pcell or PScell, the method may further comprise: sending a RACH signal via RACH resource of the Pcell or PScell; and configuring the working beam of the Pcell or PScell.

In another embodiment, a remote unit comprises: a transceiver that sends a beam failure recovery request message including information regarding beam failure recovery and information regarding a new candidate beam via a working beam of a first cell; and a processor that monitors a response via the new candidate beam of a second cell, wherein the transceiver receives the response via the new candidate beam from the second cell.

In yet another embodiment, a method comprises: receiving a beam failure recovery request message including information regarding beam failure recovery and information regarding a new candidate beam; and sending a response via the new candidate beam. Preferably, the beam failure recovery request message is received via PUSCH or PUCCH as a MAC CE message. The response may be sent in a CORSET resource preconfigured for beam recovery via PDCCH. The beam failure recovery request message is received via a working beam of a first cell. Alternatively, the beam failure recovery request message is received from another cell.

In one embodiment, a base unit comprises: a transceiver that receives a beam failure recovery request message including information regarding beam failure recovery and information regarding a new candidate beam; and sends a response via the new candidate beam.

In one embodiment, a method of recovering from beam failure, comprising: receiving a beam management message including a carrier index and a reference signal; sending a RACH signal via RACH resource to a first cell; configuring a working beam of the first cell; and configuring the working beam of the first cell as a working beam of a second cell. The method may further comprise receiving a RRC configuration for TCI-states for PDSCH and PDCCH for the first cell and for the second cell.

In another embodiment, a remote unit comprises: a transceiver that receives a beam management message including a carrier index and a reference signal and sends a RACH signal via RACH resource to a first cell; and a processor that configures a working beam of the first cell and configures the working beam of the first cell as a working beam of a second cell.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
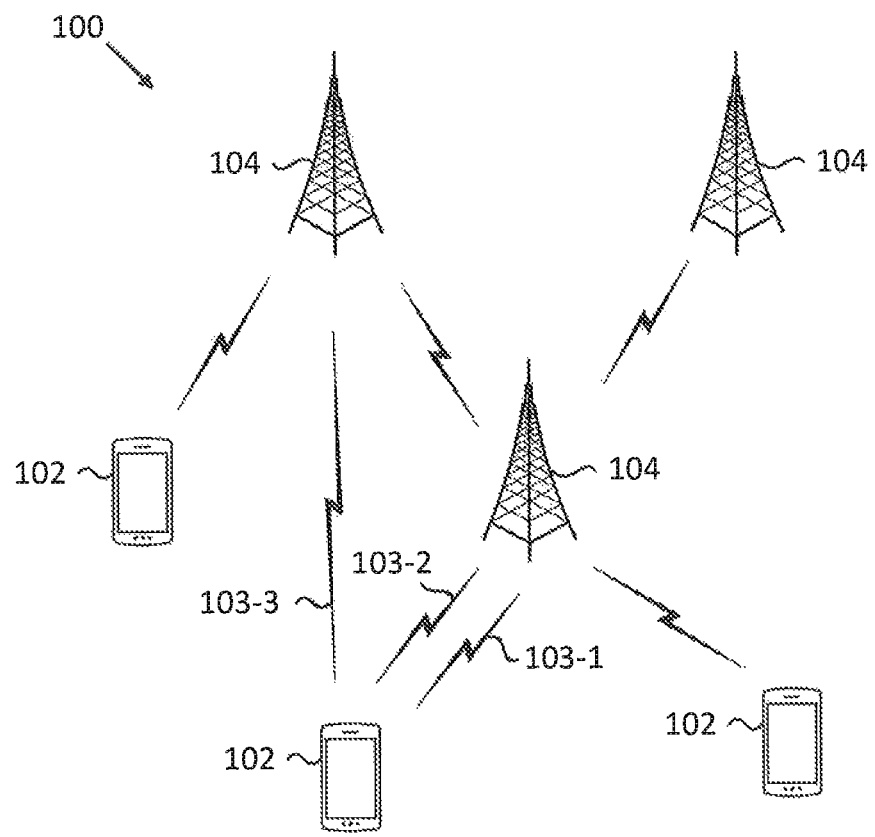
FIG. 1 is a schematic block diagram illustrating one embodiment of a wireless communication system for recovering from beam failure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory ("RAM"), read-only memory ("ROM"), erasable programmable read-only memory ("EPROM" or "Flash Memory"), portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

FIG. 1 depicts an embodiment of a wireless communication system 100 for recovering from beam failure. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the art.

The remote units 102 may communicate directly with one or more of the base units 104 via UL communication signals. A remote unit may connect to the base unit with one or more cells. In the condition of CA (Carrier Aggregation), a remote unit is connected with a base unit via a Pcell (Primary cell)

and at least one Scell (Secondary cell). The Pcell and the Scell may come from the same base unit or from different base units. As shown in FIG. 1, a remote unit 102 may connect with the same base unit 104 via cells 103-1 and 103-2. Alternatively, the remote unit 102 may connect with different base units 104 via cells 103-2 and 103-3.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR (5G). More generally, however, the wireless communication system 100 may implement some other open or proprietary communication protocol.

The base units 104 may serve a number of remote units 102 within a serving area, for example, a cell (or a cell sector) or more cells via a wireless communication link. The base units 104 transmit DL communication signals to serve the remote units 102 in the time, frequency, and/or spatial domain.

Figure 2:
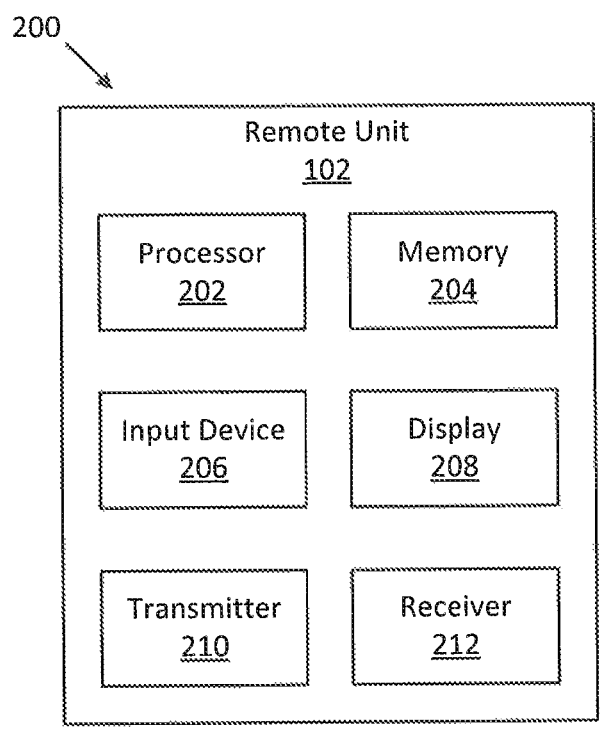
FIG. 2 is a schematic block diagram illustrating one embodiment of an apparatus that may be used for recovering from beam failure.

FIG. 2 depicts one embodiment of an apparatus 200 that may be used for recovering from beam failure. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 and the receiver 212 may transmit and receive resources via different cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
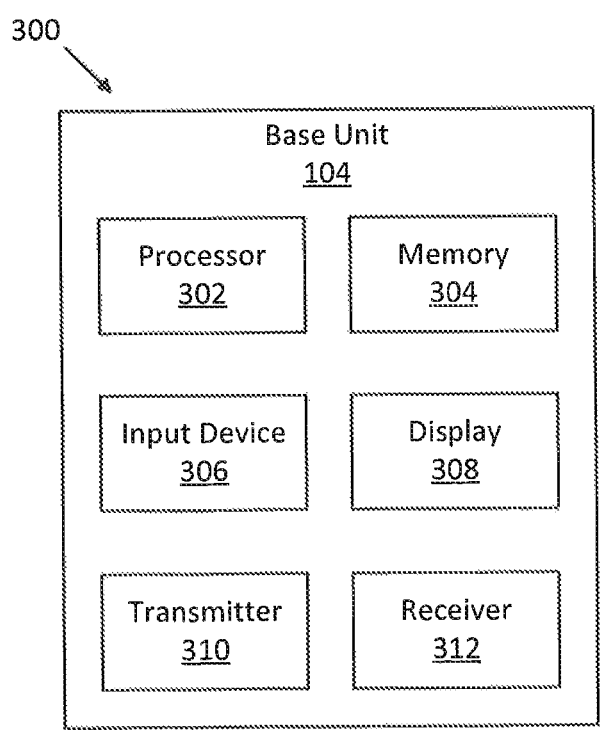
FIG. 3 is a schematic block diagram illustrating one embodiment of an apparatus that may be used for recovering from beam failure.

FIG. 3 depicts one embodiment of an apparatus 300 that may be used for recovering from beam failure. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, a base unit 104, which is a physical entity, may be referred to as a Pcell or a Scell, which is a logical entity. In CA (carrier aggregation) scenario, a remote unit may be connected with a base unit (or more base units) via a Pcell and a Scell. The connection via the Pcell and the connection via the Scell may be a connection to the same base unit, or to different base units. Therefore, a Pcell (or a Scell) may be regarded as a logical entity that can be communicated via X2 interface. That is to say, "a remote unit transmits a message via a Pcell to a base unit" may be expressed as "a remote unit transmits a message to a Pcell" in which the Pcell used herein refers to a logical entity representing the physical entity (i.e. the base unit to which is connected via the Pcell). Similarly, "a remote unit transmits a message via a Scell to a base unit" may be expressed as "a remote unit transmits a message to a Scell" in which the Scell used herein refers to a logical entity representing the physical entity (i.e. the base unit to which is connected via the Scell). Physically, the base unit to which is connected via the Pcell and the base unit to which is connected via the Scell may be the same base unit, or different base units. The Pcell and the Scell, when they represent logical entities, are different logical entities, and may be regarded as two logical entities that can communication via X2 interface. On the other hand, the Pcell and the Scell may correspond to the same base unit, or to different base units, depending on the detailed implementation of the carrier aggregation.

Figure 4:
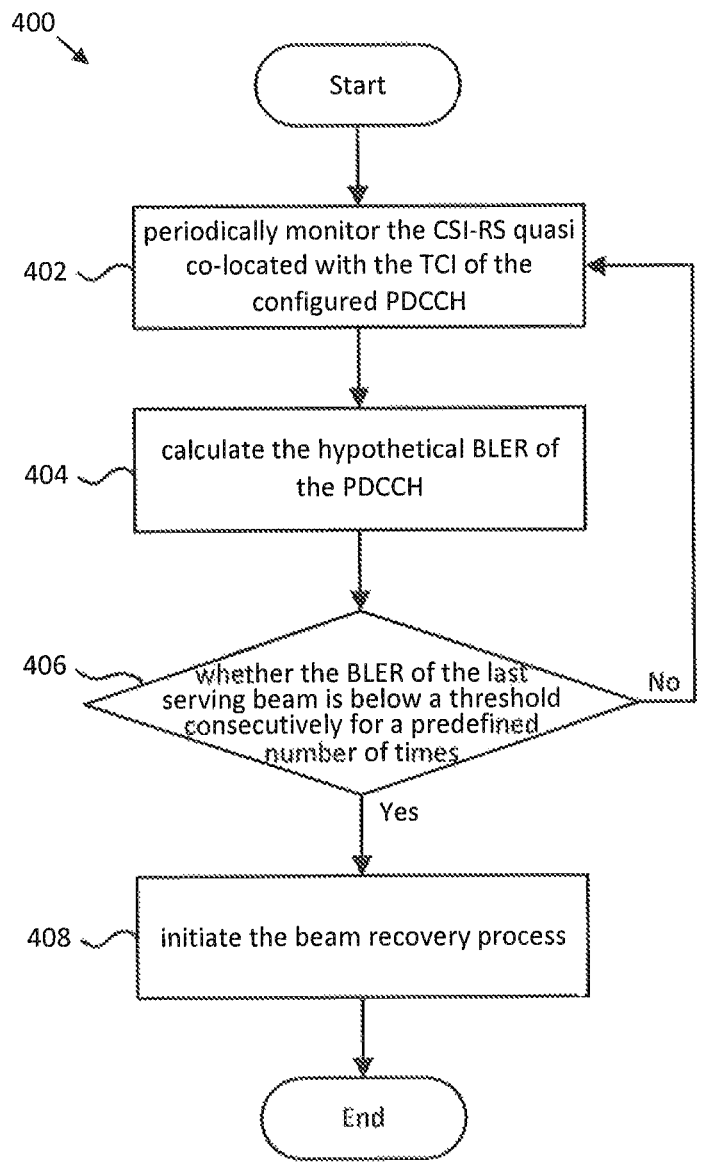
FIG. 4 is a schematic flow chart diagram illustrating an embodiment of a method for determining beam failure.

FIG. 4 is a schematic flow chart diagram illustrating a process of determining beam failure. In step 402, the remote unit periodically monitors the CSI-RS (Channel Status Indicator Reference Signal) quasi co-located with the TCI (Transmission Configuration Indication) of the configured PDCCH. In step 404, the remote unit calculates the hypothetical BLER (Block Error Rate) of the PDCCH and reports the same to its MAC layer. In step 406, it is judged whether the BLER of the last serving beam is below a threshold consecutively for a predefined number of times. If the judge result is No, the process will return to the step 402. If the judge result is Yes, the remote unit knows that all of the beams fail. The process proceeds to step 408, in which the MAC layer will instruct the PHY layer to initiate the beam recovery process.

Figure 5:
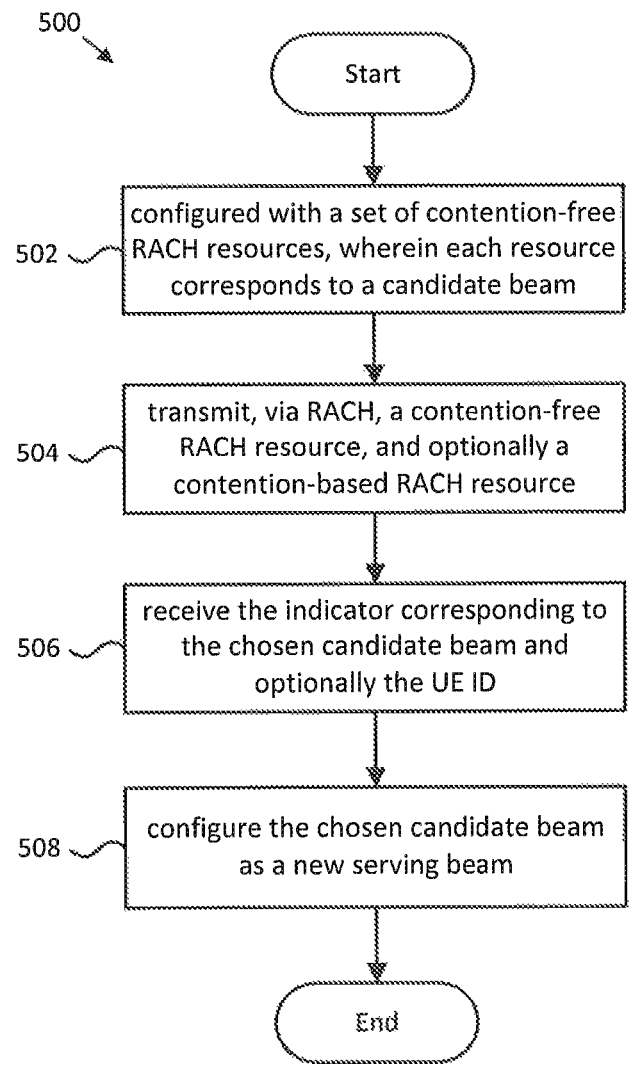
FIG. 5 is a schematic flow chart diagram illustrating an embodiment of a method for recovering from beam failure.

FIG. 5 is a schematic flow chart diagram illustrating a beam failure recovery process using RACH. In step 502, the remote unit is configured with a set of contention-free RACH resources, wherein each resource corresponds to a candidate beam that may be chosen in the condition of beam failure recovery. In step 504, the remote unit transmits, via a RACH resource, a contention-free RACH signal containing an indicator corresponding to the chosen candidate beam. The contention-free RACH transmission may also be supplemented with contention-based RACH transmission. That is to say, if the remote unit does not receive any response after a certain time, it will switch to contention-based RACH transmission. In step 506, the base unit receives the indicator corresponding to the chosen candidate beam (for contention-free beam recovery process) or the Message 3 including the UE ID and the indicator corresponding to the chosen candidate beam (for contention-based beam recovery process). The base unit learns that the remote unit wants to recover from beam failure with the chosen candidate beam. In step 508, the chosen candidate beam is configured as a new serving beam for the remote unit.

As can be seen from the above process shown in FIG. 5, both contention-free and contention-based beam recovery processes depend on RACH process. However, in NR R15, RACH resource can be defined only for PCell. Scell cannot be assigned with its own RACH resources. This prevents a remote unit from initiating the beam failure recovery process to a Scell using the beam failure recovery process shown in FIG. 5.

In the CA scenario, a remote unit is connected with a Pcell and a Scell. Methods of recovering from beam failure of Pcell and/or Scell will be described.

Figure 6:
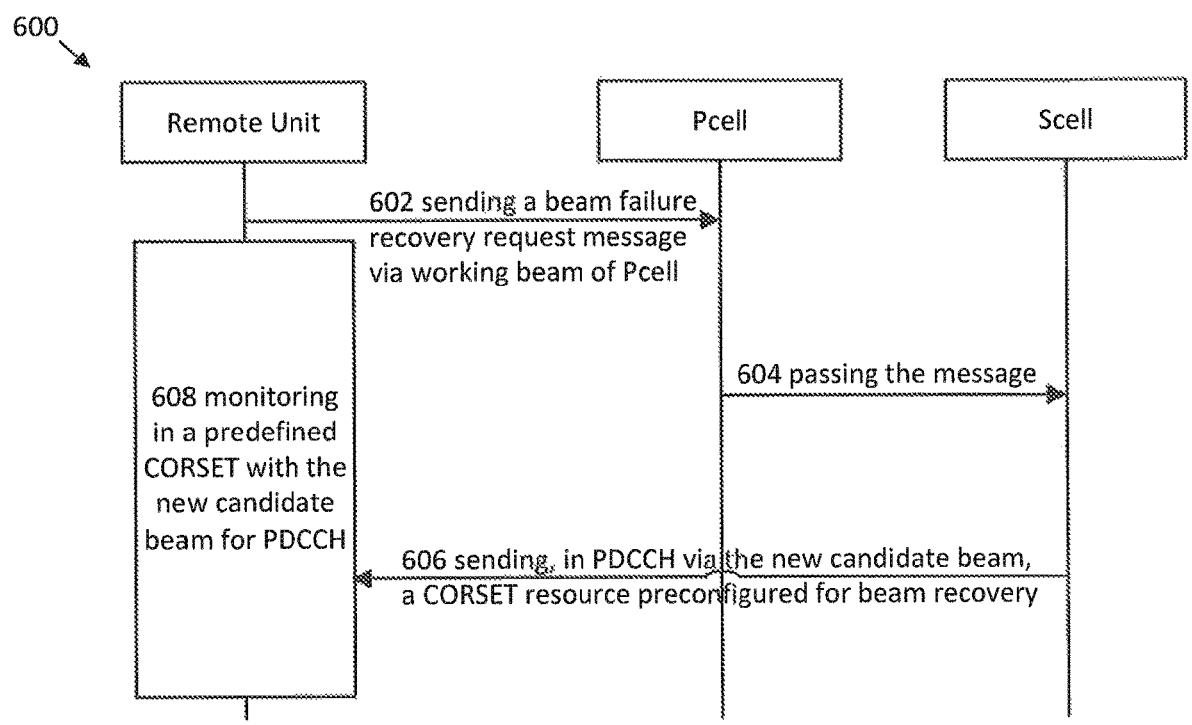
FIG. 6 is a schematic diagram illustrating a first embodiment of a method for recovering from beam failure.

A first embodiment is related to a condition in. Which all of the beams from Scell fail but at least one beam from Pcell is still working. In this condition, the UE may use the working beam(s) of the Pcell to send information regarding beam failure recovery for the Scell and information regarding new candidate beam to the base unit. FIG. 6 is a schematic flow chart diagram illustrating a beam failure recovery process of the first embodiment.

In step 602, in the condition that the remote unit determines that beam failure occurs for the Scell and at least one beam of the Pcell is still working (i.e. beam failure occurs for the Scell but does not occur for the Pcell), the remote unit sends, to Pcell, a beam failure recovery request message containing both information regarding beam failure recovery and information regarding new candidate beam via working beam(s) of the Pcell. The information regarding beam failure recovery may be "Scell ID" of the Scell for which the beam failure occurs. The information regarding new candidate beam may be CSI-RS resource ID or SSB_index of a candidate beam $q_{new}$, which is configured by the base unit through RRC for Scell beam link monitoring in Candidate-Beam-RS-List.

The message may be transmitted in the way of MAC CE in the form of "Scell ID+CSI-RS resource ID or Scell ID+SSB_index". The MAC CE may be scheduled in priority over other UL transmissions.

After sending the beam failure recovery request message to the Pcell, the remote unit monitors (step 608) for PDCCH with CRC scrambled with its C-RNTI in Beam-failure-Recovery-Response-CORESET. The monitor starts from the time the remote unit sends the beam failure recovery request message till the time configured by the higher layer parameter Beam-failure-recovery-request-window-2. In particular, with TX/RX beam correspondence and QCL information, the remote unit uses the RX spatial filter corresponding to the candidate beam $q_{new}$ to monitor the PDCCH from the Scell.

In step 604, upon receiving the beam failure recovery request message from the remote unit, the Pcell passes the message to the Scell. As described above, the Pcell and the Scell may correspond to the same base unit, or to different base units. In the condition that the Pcell and the Scell correspond to the same base unit, the step 604 may be regarded as the beam failure recovery request message only logically sending from the Pcell to the Scell. In the condition that the Pcell and the Scell correspond to different base units, the step 604 may be regarded as the beam failure recovery request message being sent from one base unit (the base unit connected via the Pcell) to another base unit (the base unit connected via the Scell).

In step 606, upon receiving the beam failure recovery request message passed from the Pcell, the Scell knows, by the information regarding beam failure recovery (i.e. Scell ID), that the beam failure occurs for the Scell, and therefore sends, in PDCCH via the new candidate beam indicated by the information regarding new candidate beam (i.e. CSI-RS resource ID or SSB_index), a CORSET resource preconfigured for beam recovery by higher layer parameter Beam-failure-Recovery-Response-CORESET.

As the remote unit is monitoring in a predefined CORSET with the new candidate beam for the PDCCH, the remote unit is able to receive the CORSET resource sent via the new candidate beam. Therefore, the beam is recovered for the Scell.

After the remote unit receives CORSET resource via the PUCCH, it may further receive in the scheduled PUSCH regarding new beam and new TCI state information (for TCI-States and/or TCI-StatesPDCCH).

In the step 602, the remote unit may send the message via PUCCH or PUSCH of the Pcell. In addition to the PUCCH or PUSCH of the Pcell, the remote unit may also choose to send the message via PUCCH of the Scell. As discussed previously, the beam failure of the Scell is defined by the BLER (of the last serving beam) falling below a threshold consecutively for a predefined number of times, in which the BLER is calculated by the remote unit. Since the remote unit only calculates the BLER of the downlink beam(s), the beam failure only means that the downlink beam(s) fail. On the other hand, the uplink beam(s) may NOT fail. Therefore, it is possible to send the message via PUCCH of the Scell, even if the downlink beam(s) of Scell fail.

Because all the downlink beams from the Scell have failed, the uplink beam(s) to Scell may also have degraded. So the PUCCH of the Scell has lower reliability. It means that the Scell may not successfully receive the message sent in PUCCH of the Scell. Therefore, it is preferable that the message is sent via the PUCCH of the Scell before it is also sent via the PUCCH or PUSCH of the Pcell. In addition, since the transmission via the PUCCH of the Scell is not reliable, the transmission of the message via the PUCCH or PUSCH of the Pcell is preferably made before a response to the transmission via the PUCCH of the Scell is received. In other words, the transmission of the message via the PUCCH or PUSCH of the Pcell shall be made within a predetermined period from the transmission of the message via the PUCCH of the Scell, in the condition that no response to the transmission of the message via the PUCCH of the Scell is received.

As described above, the remote unit may send the message via the PUCCH of the Scell, the PUCCH of the Pcell, or the PUSCH of the Pcell. The priority of using these channels has several alternatives.

Alternative 1: The priority may follow RRC configuration signal from the base unit.

Alternative 2: The priority may be fixed in a standard. A few options are (from high to low priority):

Pcell PUSCH→Pcell PUCCH→Scell PUCCH
Pcell PUSCH→Pcell PUCCH→Scell PUCCH
Scell PUCCH→Pcell PUSCH→Pcell PUCCH
Scell PUCCH→Pcell PUSCH→Pcell PUCCH Alternative 3: Use the earliest instance of Pcell PUSCH, Pcell PUCCH, Scell PUCCH.

Alternative 4: This can be decided by the remote unit.

The first embodiment is related to a condition in which all of the beams from Scell fail but at least one beam from Pcell is still working. The second embodiment is related to a condition in which all of the beams from Pcell fail but at least one beam from. Scell is still working.

The beam failure recovery of the Pcell can be performed by the process shown in FIG. 5, because RACH resources can be defined for the PCell. On the other hand, the beam failure recovery of the Pcell can be alternatively performed by the process shown in FIG. 6. In particular, in the condition that all of the beams to Pcell fail but at least one beam to Scell is still working, the remote unit may send the beam failure recovery request message to Scell via the working beam(s) of the Scell. In this ease, the roles of Pcell and Scell are reversed.

The beam failure recovery request message of the second embodiment may include information regarding beam failure recovery, which may be "Pcell ID" of the Pcell for which the beam failure occurs, and information regarding new candidate beam. The transmission of the beam failure recovery request message in the second embodiment may be via PUCCH of the Pcell (which may not be reliable), PUCCH of the Scell, or PUSCH of the Scell, in the similar way to the first embodiment.

The detailed implementation of the second embodiment is substantially the same as the first embodiment as shown in FIG. 6.

Figure 7:
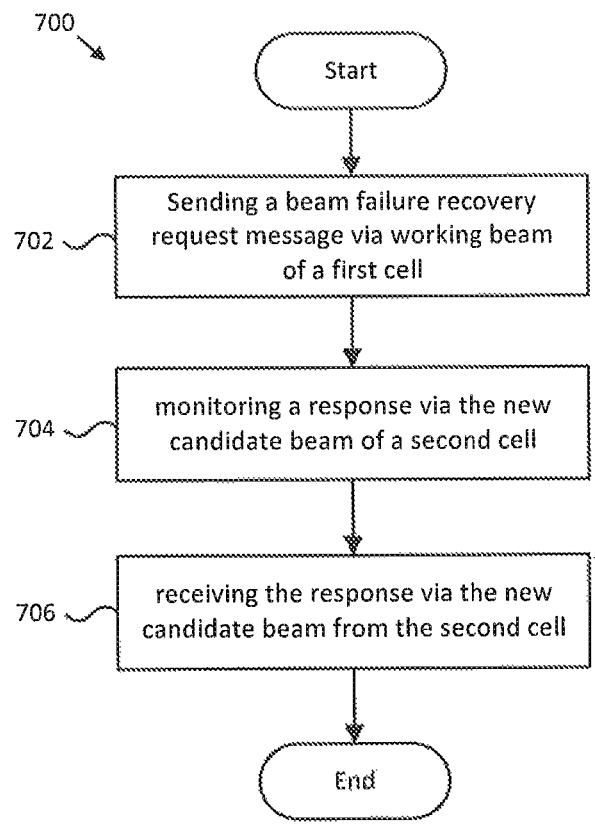
FIG. 7 is a schematic flow chart diagram illustrating the method for recovering from beam failure from the point of view of a remote unit.

FIG. 7 is a schematic flow chart diagram illustrating a beam failure recovery process from the point of view of a remote unit for both the first and the second embodiments.

In step 702 (which corresponds to the step 602 of FIG. 6), the remote unit sends a beam failure recovery request message including information regarding beam failure recovery and information regarding a new candidate beam via a working beam of a first cell. In the first embodiment, the first cell is Pcell; while in the second embodiment, the first cell is Scell.

In step 704 (which correspond to the step 608 of FIG. 6), the remote unit monitors a response via the new candidate beam of a second cell. In the first embodiment, the second cell is Scell; while in the second embodiment, the second cell is Pcell. The response is monitored via the same beam as the new candidate beam from sending the beam failure recovery request message (step 702 or step 602) for a predetermined time period (till the time configured by the higher layer parameter Beam-failure-recovery-request-window-2). The response would be a CORSET resource preconfigured for beam recovery sent via PDCCH.

In step 706, the remote unit receives the response via the new candidate beam from the second cell. Therefore, the beam is recovered.

Figure 8:
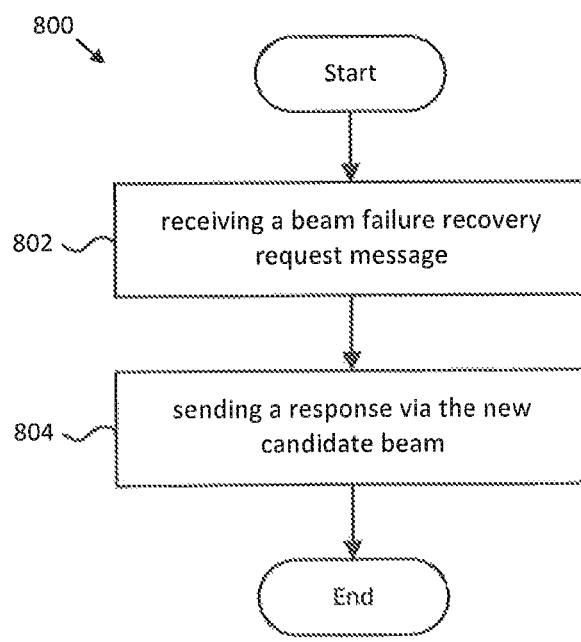
FIG. 8 is a schematic flow chart diagram illustrating the method for recovering from beam failure from the point of view of a base unit.

FIG. 8 is a schematic flow chart diagram illustrating a beam failure recovery process from the point of view of a base unit for both the first and the second embodiments.

In step 802, the base unit receives a beam failure recovery request message including information regarding beam failure recovery and information regarding a new candidate beam. In the first embodiment, the base unit receives the message via Pcell; while in the second embodiment, the base unit receives the message via Scell.

In the condition that the connection via the Pcell and the connection via the Scell are a connection to different base units, the beam failure recovery request message is received from another base unit (Pcell for the first embodiment, or Scell for the second embodiment) (corresponding to the step 604 of FIG. 6).

In step 804, the base unit sends a response via the new candidate beam. In particular, the response is CORSET resource preconfigured for beam recovery sent via PDCCH.

In the first and second embodiment, the beam failure occurs only for Scell or only for Pcell. A third embodiment is related to a condition in which the beam failure occurs for both Pcell and Scell. That is, all of the beams from Scell fail, and all of the beams from Pcell also fail.

In the condition that last downlink serving beams to the Pcell and Scell are lost at the same time, the remote unit should recover the beam to Pcell first using the process shown in FIG. 5. Afterwards, the remote unit may recover the beam to Scell using the process shown in FIG. 6.

Before using the process shown in FIG. 5 to recover beam to Pcell, the remote unit may send beam failure recovery request message via PUCCHs of both Pcell and Scell. As discussed earlier, the beam failure technically only means that the downlink beam(s) fail, but the uplink beam(s) may NOT fail. Therefore, the remote unit may try to notify the Pcell and/or the Scell of the beam failure recovery via PUCCH of Pcell and/or PUCCH of Scell. Needless to say, the transmissions via PUCCHs of both Pcell and Scell are not reliable in the condition that beam failure occurs. The process shown in FIG. 5 for recovering from beam failure of Pcell may be made before a response to the transmission via the PUCCHs of both Pcell and Scell is received.

A fourth embodiment is related to a condition in which Pcell and Scell are quasi co-located. If Pcell and Scell are transmitted from the same TRP (Transmission Receiving Point), their frequencies are relatively close from each other. Therefore, in the condition that Pcell and Scell are quasi co-located, the beam failure tends to occur to the Pcell and the Scell at the same time.

Since the Pcell may be recovered from the beam failure using the process shown in FIG. 5, in which the RACH resources are used, the Scell, which is quasi co-located with the Pcell, may use the recovered beam of the Pcell as its own recovered beam.

In particular, the QCL (quasi co-location) relationship may be defined between CSI-RS resources of the Pcell and Scell. For example, with intra-band CA, the TX/RX configuration and the channel spatial properties are similar in the carriers between Pcell and Scell, and TX and RX spatial filters of the CSI-RS or SSB of the Pcell can be reused for Scell if QCL relationship is defined between Pcell and Scell. This allows the base unit and the remote unit to manage the beams of the Scell through the beams of the Pcell without extra overhead in the Scell.

The base unit may also configure the TCI-state for PDSCH or TCI-statePDCCH for PDCCH using the CSI-RS or SSB of the Pcell In order to use, in Scell, a CSI-RS resource or SSB index defined in Pcell, a carrier index needs to be included together with the CSI-RS resource ID or SSB index when TCI states are configured by RRC. For across carrier beam management in CA, CSI-RS resource in another carrier (Pcell) can be identified as (carrier index, CRI), and SSB as (carrier index, SSB index) in the Scell.

The TCI-states for PDSCH or TCI-statePDCCH in the Scell may also be configured in the Pcell through RRC.

When the remote unit receives the RRC configuration for TCI-states, the remote unit understands from the carrier index that the spatial RX filter for the corresponding CSI-RS resource or the SSB in the Pcell should be reused in the Scell. When the TCI-states and TCI-statesPDCCH configured for the Scell have been configured, the remote unit can operate with the configured beams in the Scell.

Figure 9:
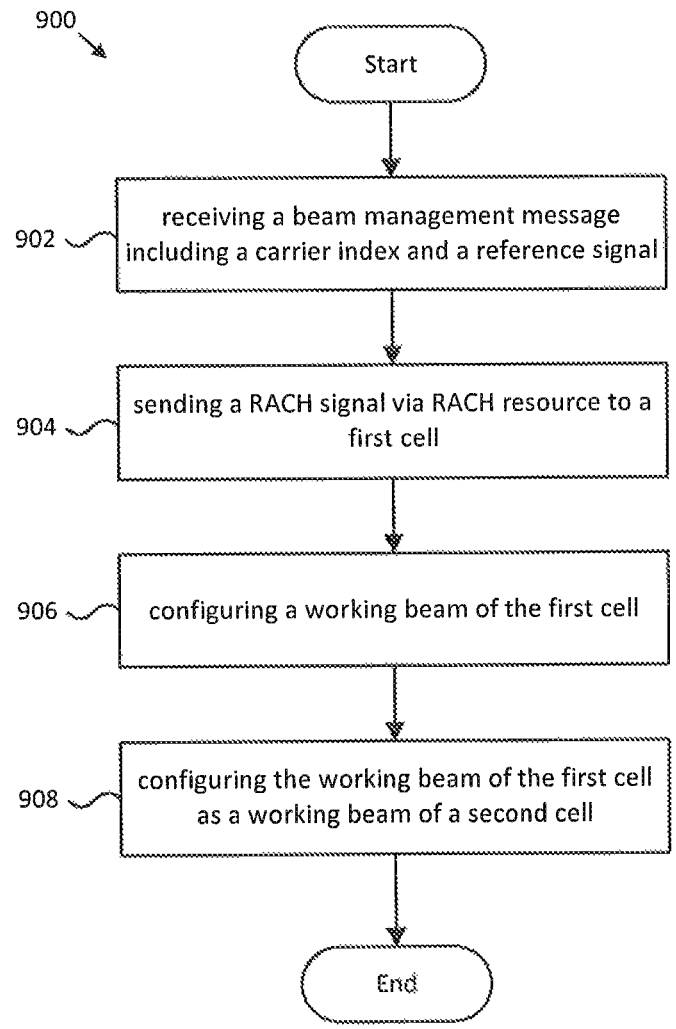
FIG. 9 is a schematic flow chart diagram illustrating the method for recovering from beam failure according to a fourth embodiment.

FIG. 9 is a schematic flow chart diagram illustrating a beam failure recovery process from the point of view of a remote unit according to the fourth embodiment.

In step 902, the remote unit receives a beam management message including a carrier index and a reference signal. The reference signal may be CSI-RS resource ID or SSB index.

In step 904, in the condition of a beam failure, the remote unit sends a RACH signal via RACH resource to a first cell. The first cell is a Pcell that may be assigned with RACH resources.

In step 906, the working beam of the first cell is configured, so that the beam is recovered for the first cell.

In step 908, the working beam of the first cell is configured as the working beam of a second cell, so that the beam is recovered for the second cell. The second cell is a Scell that cannot be assigned with RACH resources.

After the beams for the first cell and for the second cell are recovered, the remote unit may further receive a RRC configuration for TCI-states for PDSCH and PDCCH for the first cell and for the second cell.

Various solutions for recovering from beam failure in the condition of carrier aggregation are disclosed. In all of the above embodiments, the remote unit is described as being connected with base unit(s) via one Pcell and one Scell in the condition of carrier aggregation. However, in carrier aggregation, the remote unit may be connected with base unit(s) via one Pcell and a plurality of (up to four) Scells. Among the Scells, the primary Scell is a Primary-Secondary Cell (PScell). Unlike other Scells, the PScell may be assigned with its RACH resources. That is to say, in connection to the assignment of RACH resources, the PScell is similar to the Pcell. Therefore, the Pcell in all of the above embodiments may be replaced by the PScell.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   sending a beam failure recovery request message including information regarding beam failure recovery and information regarding a new candidate beam to a first cell, wherein the information regarding the new candidate beam comprises a reference signal identifier indicating a specific beam as the new candidate beam, and the beam failure recovery request message is a medium access control (MAC) control element (CE);
   monitoring, after sending the beam failure recovery request message, a response to the beam failure recovery request message exclusively via the new candidate beam of a second cell; and
   receiving the response to the beam failure recovery request message via the new candidate beam from the second cell.

2. The method of claim 1, wherein the beam failure recovery request message is sent via physical uplink shared channel (PUSCH) or physical uplink control channel (PUCCH) of the first cell.

3. The method of claim 2, wherein the beam failure recovery request message is sent via PUCCH of the second cell before it is sent via PUSCH or PUCCH of the first cell.

4. The method of claim 1, wherein the beam failure recovery request message is sent via one of physical uplink shared channel (PUSCH) of the first cell, physical uplink control channel (PUCCH) of the first cell and PUCCH of the second cell.

5. The method of claim 1, wherein the MAC CE is scheduled in a priority higher than other uplink transmissions.

6. The method of claim 1, wherein the response is monitored via a same beam as the new candidate beam from sending the beam failure recovery request message for a predetermined time period.

7. The method of claim 1, wherein physical downlink control channel (PDCCH) is monitored in a predefined control resource set (CORESET).

8. The method of claim 1, further comprising receiving, via physical downlink shared channel (PDSCH), transmission configuration indicator (TCI) state information in a radio resource control (RRC) configuration message.

9. The method of claim 1, wherein the response is a control resource set (CORESET) resource preconfigured for beam recovery sent via physical downlink control channel (PDCCH).

10. The method of claim 1, wherein the first cell is primary cell or primary-secondary cell and the second cell is secondary cell.

11. The method of claim 1, wherein the first cell is secondary cell and the second cell is primary cell or primary-secondary cell.

12. The method of claim 11, before sending the beam failure recovery request message via a working beam of the primary cell or primary-secondary cell, further comprising:
sending a random access procedure signal via random access procedure resource of the primary cell or primary-secondary cell; and
configuring the working beam of the primary cell or primary-secondary cell.

13. A method performed by a base station, the method comprising:
receiving a beam failure recovery request message including information regarding beam failure recovery and information regarding a new candidate beam, wherein the information regarding the new candidate beam comprises a reference signal identifier indicating a specific beam as the new candidate beam, and the beam failure recovery request message is a medium access control (MAC) control element (CE); and
sending, after receiving the beam failure recovery request message, a response to the beam failure recover request message exclusively via the new candidate beam.

14. The method of claim 13, wherein the beam failure recovery request message is received via physical uplink shared channel (PUSCH) or physical uplink control channel (PUCCH).

15. The method of claim 13, wherein the response is sent in a control resource set (CORESET) resource preconfigured for beam recovery via physical downlink control channel (PDCCH).

16. The method of claim 13, wherein the beam failure recovery request message is received via a working beam of a first cell.

17. The method of claim 13, wherein the beam failure recovery request message is received from another cell.

18. A user equipment (UE), comprising:
at least one memory; and
at least one processor coupled with the at least one memory and configured to cause the UE to:
send a beam failure recovery request message including information regarding beam failure recovery and information regarding a new candidate beam to a first cell, wherein the information regarding the new candidate beam comprises a reference signal identifier indicating a specific beam as the new candidate beam, and the beam failure recovery request message is a medium access control (MAC) control element (CE);
monitor, after sending the beam failure recovery request message, a response to the beam failure recovery request message exclusively via the new candidate beam of a second cell; and
receive the response to the beam failure recovery request message via the new candidate beam from the second cell.

19. The UE of claim 18, wherein the beam failure recovery request message is sent via physical uplink shared channel (PUSCH) or physical uplink control channel (PUCCH) of the first cell.

20. A base station, comprising:
at least one memory; and
at least one processor coupled with the at least one memory and configured to cause the base station to:
receive a beam failure recovery request message including information regarding beam failure recovery and information regarding a new candidate beam, wherein the information regarding the new candidate beam comprises a reference signal identifier indicating a specific beam as the new candidate beam, and the beam failure recovery request message is a medium access control (MAC) control element (CE); and
send, after receiving the beam failure recovery request message, a response to the beam failure recover request message exclusively via the new candidate beam.

* * * * *